United States Patent [19]
Nishimoto

[11] Patent Number: 5,469,357
[45] Date of Patent: Nov. 21, 1995

[54] CONTROLLING APPARATUS FOR POWER STEERING

[75] Inventor: Mitsuhiko Nishimoto, Yoshino, Japan

[73] Assignee: Koyo Seiko Co., Ltd., Osaka, Japan

[21] Appl. No.: 368,726

[22] Filed: Jan. 4, 1995

Related U.S. Application Data

[63] Continuation of Ser. No. 910,734, Jul. 8, 1992, abandoned.

[30] Foreign Application Priority Data

Jul. 9, 1991 [JP] Japan .................................. 3-195898

[51] Int. Cl.⁶ ...................................................... B62D 5/04
[52] U.S. Cl. .................... 364/424.05; 180/79.1; 180/142
[58] Field of Search ...................... 364/424.05; 180/79.1, 180/140, 141, 142; 280/91

[56] References Cited

U.S. PATENT DOCUMENTS

| | | | |
|---|---|---|---|
| 4,972,320 | 11/1990 | Sugiura et al. | 180/79.1 |
| 4,979,114 | 12/1990 | Oshita et al. | 364/424.05 |
| 5,040,629 | 8/1991 | Matsuoka et al. | 180/79.1 |
| 5,182,711 | 1/1993 | Takahashi et al. | 364/424.05 |
| 5,201,818 | 4/1993 | Nishimoto | 364/424.05 |
| 5,253,725 | 10/1993 | Nishimoto | 364/424.05 |

FOREIGN PATENT DOCUMENTS

| | | |
|---|---|---|
| 399405 | 11/1990 | European Pat. Off. . |
| 460406 | 12/1991 | European Pat. Off. . |
| 61-115771 | 6/1986 | Japan . |
| 1-309876 | 12/1989 | Japan . |
| 0234469 | 2/1990 | Japan . |
| 03227768 | 10/1991 | Japan . |

Primary Examiner—Gary Chin
Attorney, Agent, or Firm—Darby & Darby

[57] ABSTRACT

A controlling apparatus for a power steering system including a differentiation unit in which a signal selecting element judges whether a first torque detecting signal having a high gain is in a saturated range or not, a first differential current signal obtained by differentiating the first torque detecting signal in the case where the first torque detecting signal is not in the saturated range, and outputs a second differential current signal obtained by differentiating a second torque detecting signal having a low gain in the case where the first torque detecting signal is in the saturated range to generate the differential current signal for adjusting a control value of a driving current for a steering assisting motor to obtain the effect of differential control for a wide range of steering torque without producing an inharmonious steering feeling.

9 Claims, 5 Drawing Sheets

1

CONTROLLING APPARATUS FOR POWER STEERING

This is a continuation of U.S. application Ser. No. 7/910,734, filed Jul. 8, 1992, now abandoned.

BACKGROUND OF THE INVENTION

1. Field of the Invention

The present invention relates to a controlling apparatus for an electrically-driven power steering system installed on an automobile.

2. Description of the Related Art

An electrically-driven power steering system installed on an automobile is designed to assist an operation force necessary for steering the automobile by using a motor. The system's controlling apparatus has a torque sensor which detects a rotational force applied to a steering wheel and a motor which assists the operation of a steering mechanism are disposed on the steering mechanism to which the steering wheel is connected in an interlocking fashion through a shaft. The operation force of the steering wheel is reduced by driving the motor responsive to detection values of the torque sensor.

In such a power steering system, there were problems of deterioration in effectiveness of the steering mechanism because of a phase delay in an electric circuit of the controlling apparatus due to the motor inertia and friction introduced by a reduction unit interposed between the motor and the steering mechanism. In order to solve the problems, a technique of adjusting a motor current by differentiating detecting signals of the torque sensor is shown in Japanese Patent Application Laid-Open No. 61-115771 (1986). This technique performs a differential control, which operates the steering mechanism without a time delay by differentiating the detecting signal of the torque sensor, adding a differentiated signal to a temporary control value obtained responsive to the detecting signal of the torque sensor, and responding to a steering force detected by the torque sensor.

In an apparatus in which such differential control is implemented, the torque sensor detecting signal and a temporary target value of a motor driving current are functionally processed beforehand. The temporary target value of the motor driving current is decided from the torque sensor detecting signal by using this function, and the differentiated signal of the torque sensor detecting signal is added to this temporary target value to decide a final target value of the motor driving current. Then, the motor current is controlled so as to coincide with the decided target value to assist the steering. In this case, for example, such as disclosed in U.S. patent application No. 686,107 now U.S. Pat. No. 5,201,818, an apparatus which uses a high gain signal is obtained by amplifying the output signal of the torque sensor, or a low gain signal obtained by not amplifying the output signal of the torque sensor, as a detecting signal which is subject to the differential processing.

In a conventional controlling apparatus for a power steering system which performs the differential control there were such problems as described below. In case of using the high gain signal, though its differential amount is large, on the other hand, since this signal has a high gain, it becomes saturated above a predetermined torque. Thus the differential control does not work and an inharmonious feeling, such as a feeling of hooking, is produced in steering feeling because the differential amount becomes zero in the saturated range. Meanwhile, in case of using a low gain signal, though the differential control works in a wide range of steering torque, on the other hand, since the differential amount is small, an effect of differential control is not obtained sufficiently. Thus, when its differential constant is increased to obtain the effect of differential control sufficiently, the differential value is liable to oscillate, thereby producing vibration in steering.

SUMMARY OF THE INVENTION

The present invention has been devised in view of such circumstances. It is therefore a primary object thereof to provide a controlling apparatus for a power steering system, which is capable of obtaining a sufficient effect of differential control over a wide range of steering torque without producing an inharmonious feeling in steering feeling.

The controlling apparatus for the power steering system according to the present invention is constituted such that, the detection result of a torque sensor which detects a steering torque applied to a steering wheel is represented by a high gain first detecting signal which saturates in a predetermined torque range, and a second detecting signal whose gain is lower and which does not saturate in the predetermined torque range to decide a motor driving current responsive to the first detecting signal. This is also judging means for judging whether the first detecting signal is in the predetermined torque range, and means for adjusting the motor driving current on the basis of a differentiated signal of the first detecting signal in the case where it is judged that the first detecting signal is not in the predetermined torque range, and adjusting the motor driving current on the basis of a differentiated signal of the second detecting signal in the case where it is judged that the first detecting signal is in the predetermined torque range.

In such controlling apparatus, though the motor driving current is adjusted on the basis of the differentiated signal of the first detecting signal in the case where the first detecting signal representing the detection result of the torque sensor is not saturated, since gain of the first detecting signal is relatively high and its differential value is large in this case, a sufficient adjusting amount of the motor driving current can be obtained sufficiently. Since the motor driving current is adjusted on the basis of the differentiated signal of the second detecting signal when the first detecting signal is saturated, the adjusting amount of the motor driving current can also be obtained in the torque range when the first detecting signal is saturated. Thereby, the adjusting amount of the motor driving current is obtained for a wide range of steering torque. In such a way, since the adjusting amount of the motor driving current is obtained even when the first detecting signal is saturated, the motor driving current is adjusted for a wide range of steering torque without producing the inharmonious feeling in steering feeling.

The above and further objects and features of the invention will more fully be apparent from the following detailed description with accompanying drawings.

DESCRIPTION OF THE PREFERRED EMBODIMENTS

Figure 1:
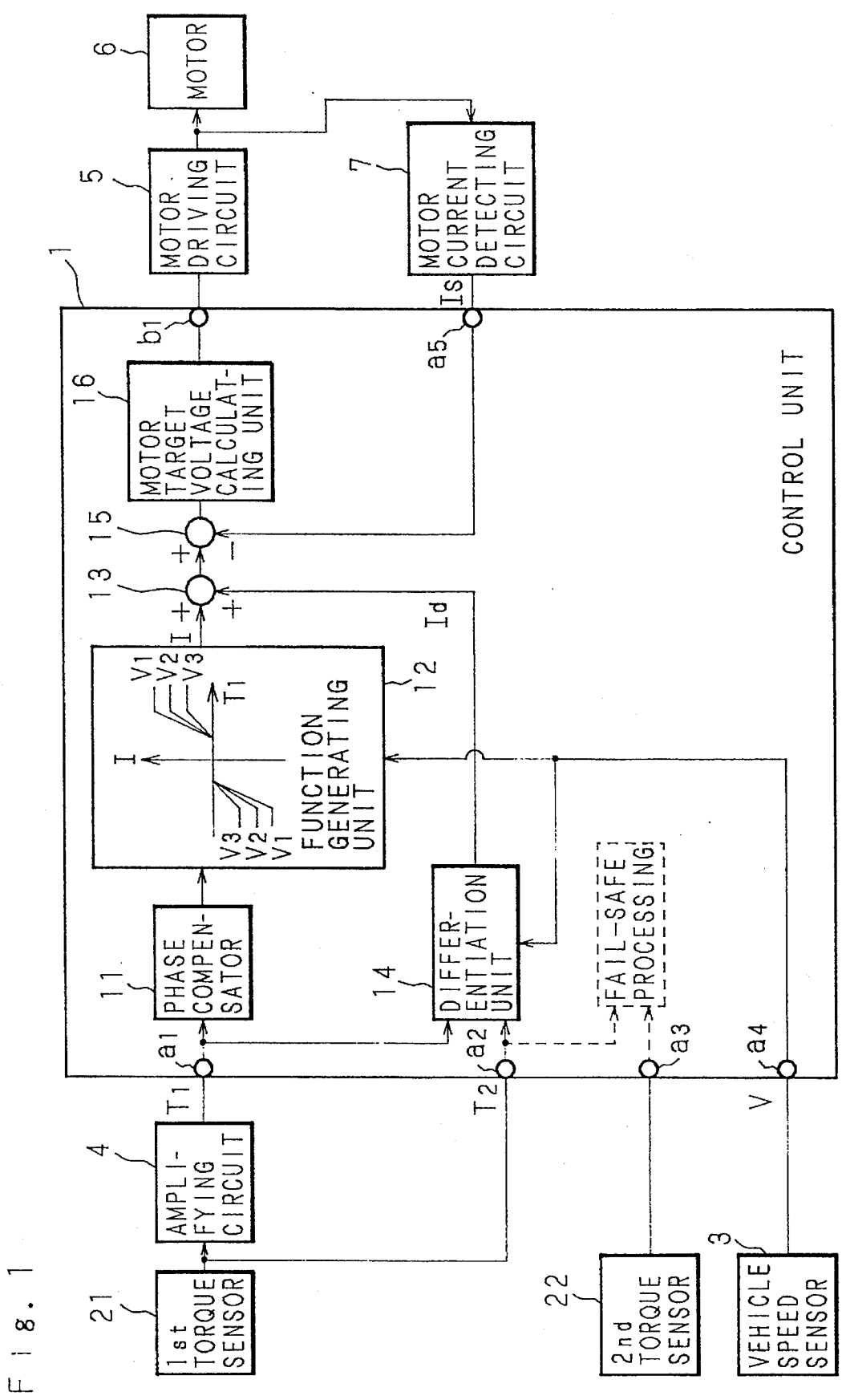
FIG. 1 is a block diagram showing a configuration of a controlling apparatus for a power steering system according to the present invention.

In FIG. 1, numeral 1 designates a control unit including input ports $a_1$, $a_2$, $a_3$, $a_4$, $a_5$ and an output port $b_1$.

To the input port $a_1$, a detecting signal of a first torque sensor 21 which detects a rotational force applied to a steering wheel connected to a steering mechanism in an interlocking fashion via a shaft, is given as a first torque detecting signal $T_1$ of a steering torque via an amplifying circuit 4 which sets a gain and upper/lower limit values. The first torque detecting signal $T_1$ has its voltage saturated by the amplifying circuit 4 in the case where the detected steering torque exceeds a detection range necessity for assisting the steering in a usual running state.

To the input port $a_2$, the detecting signal of the first torque sensor 21 which does not pass through the amplifying circuit 4 is applied as a second torque detecting signal $T_2$.

To the input port $a_3$, in the same way as the first torque sensor 21, is applied a detecting signal of a second torque sensor 22 which detects a rotational force applied to the steering wheel connected to the steering mechanism in an interlocking fashion via the shaft.

To the input port $a_4$, is applied a vehicle speed detecting signal V which is an output of a vehicle speed sensor 3 detecting a vehicle running speed.

To an input port $a_5$, is applied a current detecting signal Is which is an output of a motor current detecting circuit 7 detecting a driving current of a motor 6 which performs the steering assisting operation of the steering mechanism Meanwhile, an output port $b_1$, is connected a motor driving circuit 5 which drives the motor 6.

The first torque detecting signal $T_1$ inputted to the input port $a_1$ of the control unit 1 is applied to a phase compensator 11 and a differentiation unit 14. The first torque detecting signal $T_1$ applied to the phase compensator 11 has its phase processed and the phase compensated signal is applied to a function generating unit 12. The function generating unit 12 inputs the first torque detecting signal $T_1$ which has been phase compensated, and outputs a target current I which temporary target value of the motor current.

The function generating unit 12, as shown in FIG. 1, functions such that the target current I increases proportionally as the first torque detecting signal $T_1$ is increased when the first torque detecting signal $T_1$ exceeds a predetermined dead zone. The target current I is saturated when, further, the first torque detecting signal $T_1$ exceeds a predetermined value, are decided variably responsive to the vehicle speed detecting signal V (where, $V_1<V_2<V_3$) such that, a ratio of target current I against the first torque detecting signal $T_1$ as well as a saturated value of the target current I become smaller, as the vehicle speed detecting signals $V_1$, $V_2$, $V_3$ . . . become larger. In the function generating unit 12, the target value I is decided responsive to the first torque detecting signal $T_1$ from the phase compensator 11 and applied to an adder 13.

The second torque detecting signal $T_2$ inputted from the input port $a_2$ is applied to a differentiation unit 14 having a configuration, to be described later, and at the same time used as fail-safe processing for interlocking various controlling apparatuses at instances of trouble. To the differentiation unit 14, the vehicle speed detecting signal V is also inputted from the input port $a_4$ besides the first torque detecting signal $T_1$ and the second torque detecting signal $T_2$. In the differentiation unit 14, by a method to be described later, the first torque detecting signal $T_1$ and the second torque detecting signal $T_2$ are respectively differentiated, and compensated by using a differential constant decided responsive to the vehicle speed detecting signal V, and either of these results is applied to the adder 13 as a differential current Id. In the adder 13, the target current I from the function generating unit 12 and the differential current Id from the differentiation unit 14 are added and the added result is applied to a subtracter 15.

Also, the detecting signal of the second torque sensor 22 input ted from the input port $a_3$ is used for fail-safe processing.

The current detecting signal Is inputted from the input port $a_5$ is applied to the subtracter 15. In the subtracter 15, the current detecting signal Is is subtracted from the added result of the adder 13, and the subtracted result is given to a motor target voltage calculating unit 16. In the motor target voltage calculating unit 16, the subtracted result is subjected to PID (Proportional plus Integral plus Derivative) calculation, and a PWM (Pulse Width Modulation) signal on the basis of the calculated result is applied to the motor driving circuit 5 via the output port $b_1$.

Figure 2:
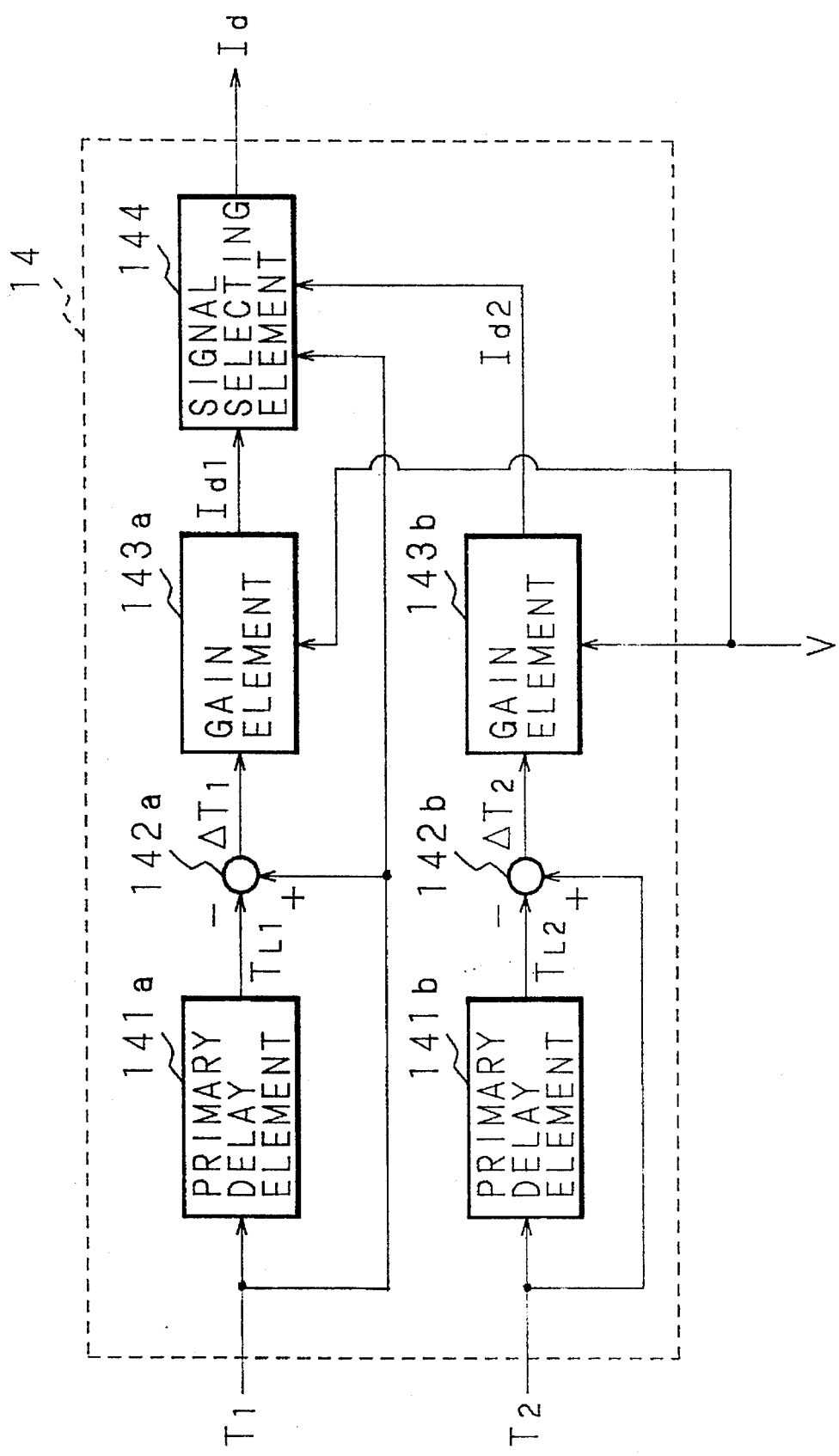
FIG. 2 is a block diagram showing a specific configuration of its differentiation unit.

A detailed configuration of the differentiation unit 14 is described. FIG. 2 is a block diagram showing the configuration of the differentiation unit 14.

In the differentiation unit 14, the first torque detecting signal $T_1$ is applied to a primary delay element 141a, a subtracting element 142a and a signal selecting element 144, respectively. In the primary delay element 141a, a primary delay signal is outputted against the first torque detecting signal $T_1$ which is the input signal, and a primary delay signal $T_{L1}$ outputted from the primary delay element 141a is applied to the subtracting element 142a. In the subtracting element 142a, the primary delay signal $T_{L1}$ is subtracted from the first torque detecting signal $T_1$, and a differential value $\Delta T_1$ which is its subtracted result is applied to the gain element 143a. To the gain element 143a, a vehicle speed detecting signal V is applied in addition to the differential value $\Delta T_1$. In the gain element 143a, the differential value $\Delta T_1$ is multiplied by a differential constant $K_1$ responsive to the vehicle speed detecting signal V, and the result is applied to the signal selecting element 144 as a first differential current $I_{d1}$.

In the differentiation unit 14, the second torque detecting signal $T_2$ is respectively applied to a primary delay element 141b and a subtracting element 142b. In the primary delay element 141b, the primary delay signal is outputted against the second torque detecting signal $T_2$ which is the input signal, and a primary delay signal $T_{L2}$ outputted from the primary delay element 141b is applied to a subtracting element 142b. In the subtracting element 142b, the primary delay signal $T_{L2}$ is subtracted from the second torque detecting signal $T_2$, and a differential value $\Delta T_2$ which is its subtracted result is applied to a gain element 143b. The vehicle speed detecting signal V is also applied to the gain element 143b in addition the differential value $\Delta T_2$. In the gain element 143b, the differential value $\Delta t_2$ is multiplied by a differential constant $K_2$ responsive to the vehicle detecting signal V, and its result is applied to the signal selecting element 144 as a second differential current $I_{d2}$.

The signal selecting element 144, operates such that either the first differential current $I_{d1}$ or the second differential current $I_{d2}$ is selectively applied to the adder 13 shown in FIG. 1 as the differential current $I_d$. Specifically, the signal selecting element 144 outputs the first differential current $I_{d1}$ as the differential current $I_d$ in the case where the first torque detecting signal $T_1$ is not in its saturation range. It outputs the second differential current $I_{d2}$ as the differential current $I_d$ in the case where the first torque detecting signal $T_1$ is in its saturation range. The differential current $I_d$ outputted from the signal selecting element 144 is applied to the adder 13.

Figure 3:
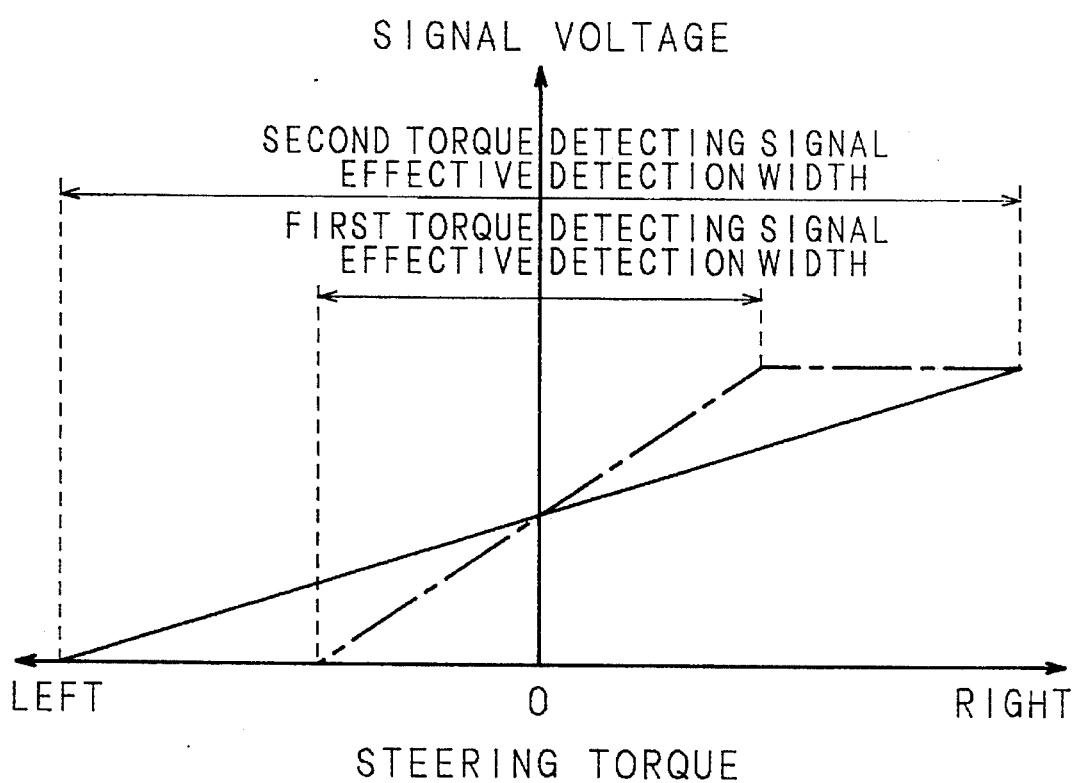
FIG. 3 is a graph showing an example of the relationship between a steering torque and a signal voltage in a first torque detecting signal and a second torque detecting signal.

Next, respective steering torque detection ranges of the first torque detecting signal $T_1$ and the second torque detecting signal $T_2$ are described. FIG. 3 is a graph showing an example of a relationship between a steering torque and a signal voltage in the first torque detecting signal $T_1$ and the second torque detecting signal $T_2$, wherein the signal voltage is plotted along the ordinate and the steering torque is plotted along the abscissa. With respect to the first torque detecting signal $T_1$, the relationship is shown by the one-dot-chain line, and with respect to the second torque detecting signal $T_2$, the relationship is shown by the solid line.

In the first torque detecting signal $T_1$, in the case where the detected steering torque exceeds a detection range which is necessary for assisting the steering in the usual running state, it voltage is saturated by the amplifying circuit 4. In the first torque detecting signal $T_1$, the detection range becomes an effective detection width of the steering torque. Meanwhile, in the second torque detecting signal $T_2$, since the signal is not amplified in the amplifying circuit 4 and is applied directly to the input port $a_2$ from the first torque sensor 21, the signal gain is lower than that of the first torque detecting signal $T_1$. And hence, the effective detection width of the second torque detecting signal is wider than that of the first torque detecting signal $T_1$, and information of the steering torque in a range including the saturation range of the first torque detecting signal $T_1$ is obtained from the second torque detecting signal $T_2$.

The differentiation unit 14 outputs the differentiated result of the first torque detecting signal $T_1$ as a differential current $I_d$, in the case where the first torque detecting signal $T_1$ is not in its saturation range. Since the first torque detecting signal $T_1$ has a high signal gain, a sufficient differential current $I_d$ for operating the differential control is outputted. The differentiation unit 14 outputs the differentiated result of the second torque detecting signal $T_2$ as the differential current $I_d$ in the case where the first torque detecting signal $T_1$ is in its saturation range. Thus, it is possible to operate the differential control even in the saturation range of the first torque detecting signal $T_1$. And hence, a sufficient effect of the differential control can be obtained for a wide range of steering torque without producing an inharmonious feeling in steering feeling.

Figure 4:
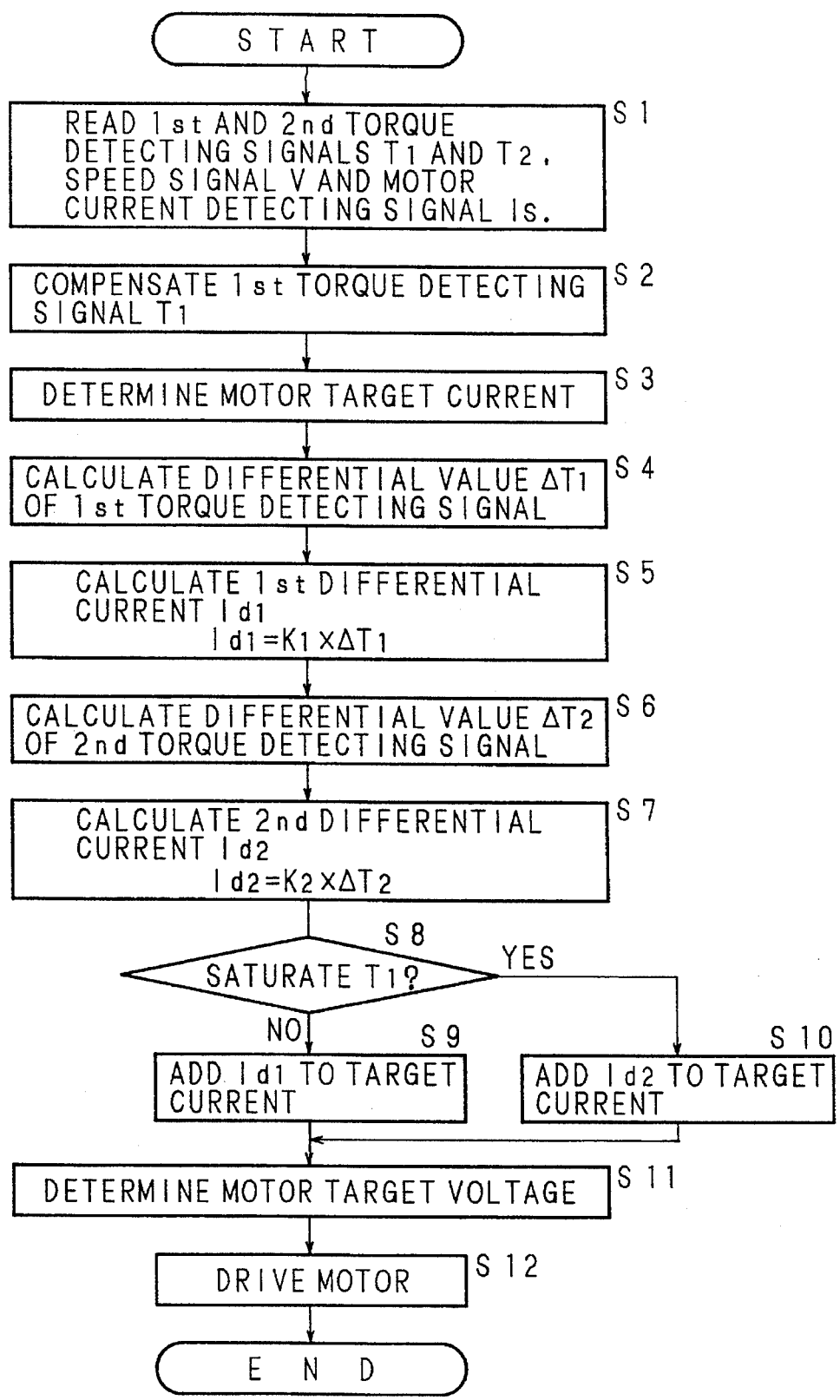
FIG. 4 is a flow chart for explaining the operation of a controlling apparatus for a power steering system of the present invention.

Next, the operation of the control unit 1 is described with reference to a flow chart shown in FIG. 4.

First, the first torque detecting signal $T_1$ inputted to the input port $a_1$, the second torque detecting signal $T_2$ inputted to the input port $a_2$, the vehicle speed detecting signal V inputted to the input port $a_4$ and the current detecting signal $I_s$ inputted to the input port $a_5$ are respectively read (Step S1). The first torque detecting signal $T_1$ read from the input port $a_1$ is subjected to phase compensation by a phase compensator 11 (Step S2).

In a function generating unit 12, a target current I is decided on the basis of the first torque detecting signal $T_1$ whose phase is compensated and the vehicle speed detecting signal V applied to the input port $a_4$ (Step S3).

In the differentiation unit 14, simultaneously with the processings in Steps S2 and S3, the differential value $\Delta T_1$ of the first torque detecting signal $T_1$ is calculated (Step S4), and by multiplying the calculated differential value $\Delta T_1$ by a differential constant $K_1$, the first differential current $I_{d1}$ is obtained (step S5). Also, simultaneously with the processings in Steps S4 and S5, the differential value $\Delta T_2$ of the second torque detecting: signal $T_2$ is calculated (step S6), and by multiplying the calculated differential value $\Delta T_2$ by the differential constant $K_2$, the second differential current $I_{d2}$ is obtained (Step S7).

In the signal selecting element 144, it is judged whether the first torque detecting signal $T_1$ is in the saturation range (Step S8). In the case where it is judged that the first torque detecting signal $T_1$ is not in the saturation range, the first differential current $I_{d1}$ as the differential current $I_d$ is added to the target current I in the adder 13, and a final target current for driving the motor 6 is decided (Step S9). Meanwhile, in the case where it is judged that the first torque detecting signal $T_1$ is in the saturation range, the second differential current $I_{d2}$ as the differential current $I_d$ is added to the target current I in the adder 13, and a final target current for driving the motor 6 is decided (Step S10).

In the subtracter 15, the current detecting signal $I_s$ applied to the input port $a_5$ is subtracted from the final target current decided as stated before. The subtracted result of the subtracter 15 is subjected to the PID control in a motor target voltage calculating unit 16 to decide a target voltage of the motor (Step S11). The motor driving circuit 5 drives the motor 6 (Step S12) to assist the steering responsive to the PWM signal given from the motor target voltage calculating unit 16.

Figure 5:
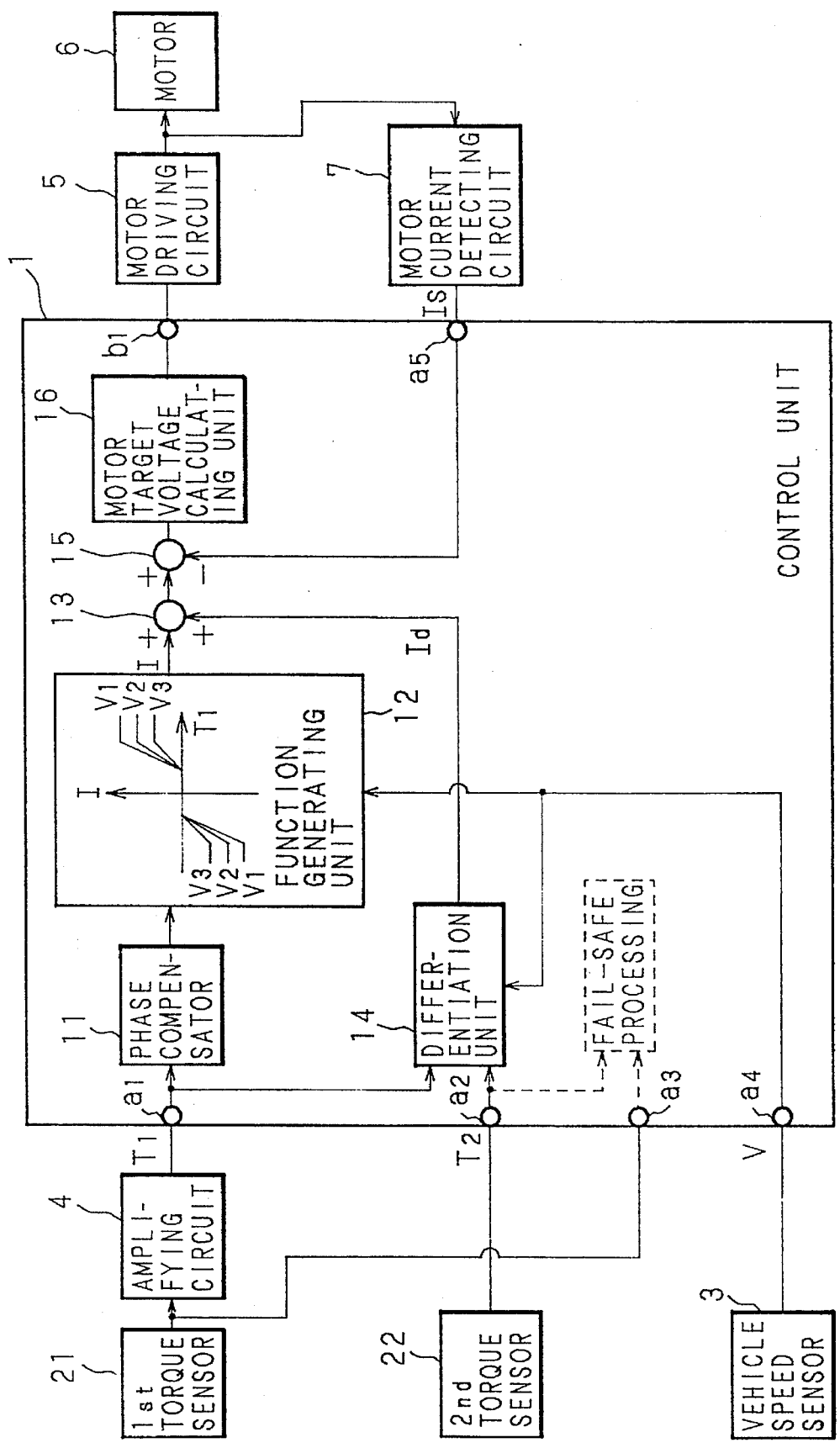
FIG. 5 is a block diagram showing a configuration of controlling apparatus for a power steering system showing another embodiment of the present invention.

FIG. 5 is a block diagram showing a configuration of a controlling apparatus for a power steering system showing another embodiment of the present invention, wherein the same or corresponding parts of FIG. 1 are designated by the same reference numerals and their explanation is omitted.

In FIG. 5, a point different from the controlling apparatus of FIG. 1 is the one where the detecting signal of the second torque sensor 22 is used as the second torque detecting signal $T_2$ in the differentiation unit 14. That is, in FIG. 1 it is arranged such that the detecting signal is applied directly to the input port $a_2$ from the second torque sensor 22, which is the sensor for detecting the steering torque for the fail-safe processing as stated above, and in FIG. 5 the detecting signal is divided into the second torque detecting signal $T_2$ which is differentiated in the differentiation unit 14 and a signal which receives the fail-safe processing. The circuit of FIG. 5 is also arranged such that, the detecting signal of the first toque sensor 21 is applied to the input port $a_1$ via the amplifying circuit 4, and at the same time, applied to the input port $a_3$, and the signal given to the input port $a_3$ serves as the signal for the fail-safe processing. Other configurations are as same as the embodiment shown in FIG. 1, and its operation is also same as that of the controlling apparatus shown in FIG. 1.

As stated above, in the controlling apparatus for the power steering system according to the present invention, in the case where the first torque detecting signal $T_1$ is not saturated, though the driving current of the motor 6 is adjusted on the basis of its differentiated signal, since the gain of the first torque detecting signal $T_1$ is relatively high and its differential value is large, an adjusting amount of the driving current of the motor 6 can be obtained sufficiently. In the case where the first torque detecting signal $T_1$ is saturated, since the driving current of the motor 6 is adjusted on the basis of its differentiated signal, the adjusting amount of the motor 6 is obtained even in a torque range wherein the first torque detecting signal $T_1$ is saturated. Thereby, it is possible to obtain the adjusting amount of the driving current control value of the motor 6 for a wide range of steering torque. As such, since the driving current adjusting amount of the motor 6 is obtained even when the first torque detecting signal $T_1$ is saturated, the present invention is very effective in obtaining the effect of differential control sufficiently for the wide range of steering torque, without producing an inharmonious feeling in steering feeling.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A controlling apparatus for a power steering system including a torque sensor for detecting steering torque applied to a steering wheel, and a steering assisting motor which is driven on the basis of a detecting signal of said torque sensor comprising:
    means for generating a driving current for said motor responsive to the detecting signal of said torque sensor;
    means for amplifying the detecting signal of said torque sensor and outputting as a first torque detecting signal;
    means for differentiating each of said first torque detecting signal and the unamplified detecting signal of said torque sensor, compensating each said differentiated signal responsive to a detected signal of a vehicle state, and selectively outputting either of said compensated differentiated signals corresponding to said first torque detecting signal; and
    means for adjusting the driving current of said motor on the basis of the signal selectively outputted from said differentiating means.

2. A controlling apparatus for a power steering system as set forth in claim 1, wherein said detected signal of the vehicle state is a vehicle speed detecting signal detected by a vehicle speed sensor.

3. A controlling apparatus for a power steering system as set forth in claim 1 wherein said generating means includes function generator means for producing an output current of a magnitude corresponding to the magnitude of said first torque detecting signal.

4. A controlling apparatus for a power steering system including a torque sensor for detecting steering torque applied to a steering wheel, and a steering assisting motor which is driven on the basis of a detecting signal of said torque sensor, comprising:
    means for amplifying said detecting signal of said torque sensor and outputting a first torque detecting signal which saturates in a predetermined torque range;
    function generating means which converts said first torque detecting signal according to a predetermined function to generate a driving current for said motor;
    a differentiation unit means having:
        means for differentiating said first torque detecting signal;
        means for differentiating said detecting signal of said torque sensor;
        first means for compensating the differentiated first torque detecting signal corresponding to a detected signal of a vehicle state;
        second means for compensating the differentiated signal of said detecting signal of said torque sensor corresponding to said detected signal of the vehicle state;
        selecting means for judging whether said first torque detecting signal is in said predetermined torque range or not, outputting the output signal of said first compensating means when said first torque detecting signal is not in said predetermined torque range, and outputting the output signal of said second compensating means when said first torque detecting signal is in said predetermined torque range; and
    means for adding the signal outputted from said differentiation unit means and the driving current of said motor for adjustment.

5. A controlling apparatus for a power steering system as set forth in claim 4, wherein said detected signal of the vehicle state is a vehicle speed detecting signal detected by a vehicle speed sensor.

6. A controlling apparatus for a power steering system including a first torque sensor and a second torque sensor for detecting steering torque applied to a steering wheel, and a steering assisting motor which is driven on the basis of a detecting signal of said first torque sensor, comprising:
    means for generating a driving current for said motor responsive to said detecting signal of said first torque sensor;
    means for amplifying said detecting signal of said first torque sensor and outputting as a first torque detecting signal;
    means for differentiating said first torque detecting signal and the unamplified detecting signal of said second torque sensor, compensating each said differentiated signal responsive to a detected signal of a vehicle state, and selectively outputting either of said compensated differentiated signals corresponding to said first torque detecting signal; and
    means for adjusting the driving current of said motor on the basis of the signal selectively outputted from said differentiating means.

7. A controlling apparatus for a power steering system as set forth in claim 6, wherein said detected signal of the vehicle state is a vehicle speed detecting signal detected by a vehicle speed sensor.

8. A controlling apparatus for a power steering system including a first torque sensor and a second torque sensor for detecting steering torque applied to a steering wheel, and a steering assisting motor which is driven on the basis of a detecting signal of said first torque sensor, comprising:
    means for amplifying the detecting signal of said first torque sensor and outputting a first torque detecting signal which saturates in a predetermined torque range;
    a function generating unit which converts said first torque detecting signal according to a predetermined function to generate a driving current for said motor;
    differentiation unit means having:
        first means for differentiating said first torque detecting signal;
        second means for differentiating the detecting signal of said second torque sensor;
        first compensating means which compensates the differentiated first torque detecting signal corresponding to a detected signal of a vehicle state;

second compensating means which compensates the differentiated signal of said second torque sensor detecting signal corresponding to said detected signal of the vehicle state;

selecting means for judging whether or not said first torque detecting signal is in said predetermined torque range, outputting the output signal of said first compensating means when said first torque detecting signal is not in said predetermined torque range, and outputting the output signal of said second compensating means when said first torque detecting signal is in said predetermined torque range; and means for adding the signal outputted from said differentiation unit means and the driving current of said motor for adjustment.

9. A controlling apparatus for a power steering system as set forth in claim 8, wherein said detected signal of the vehicle state is a vehicle speed detecting signal detected by a vehicle speed sensor.

* * * * *